United States Patent [19]

Simon

[11] 4,222,551
[45] Sep. 16, 1980

[54] PULLEY-BLOCK WEIGHING-BALANCE

[76] Inventor: Francois Simon, Route d'Annecy, 73410 Albens, France

[21] Appl. No.: 947,031

[22] Filed: Sep. 29, 1978

[30] Foreign Application Priority Data

Oct. 4, 1977 [FR] France ............................. 77 29834

[51] Int. Cl.³ .......................... B66D 1/00; B66D 1/48
[52] U.S. Cl. .................................... 177/132; 414/21; 177/245; 254/390; 254/401
[58] Field of Search ............... 254/167, 173 R, 173 B, 254/154, 155, 168

[56] References Cited

U.S. PATENT DOCUMENTS

| 2,080,804 | 5/1937 | Brantly ........................... 254/173 B |
| 2,434,138 | 1/1948 | Adams ............................. 254/173 X |
| 2,659,574 | 11/1953 | Crookston ....................... 254/173 B |
| 3,203,672 | 8/1965 | Santos ............................. 254/173 R |

Primary Examiner—Edward J. McCarthy
Attorney, Agent, or Firm—Peter L. Berger

[57] ABSTRACT

The pulley-block balance comprises at least one loose pulley, a hollow coaxial support fitted with ball-bearings for supporting the pulley or pulleys, and a load-lifting hook. Coupling means between the hook and the support comprise a movable member which is capable of undergoing displacement at least at the point of application of the force arising from the load and is subjected to a restoring action in the direction opposite to the force. The movable member controls load-indicating means as a result of its displacement.

12 Claims, 8 Drawing Figures

PULLEY-BLOCK WEIGHING-BALANCE

This invention relates to pulley-block weighing-balances, that is to say to lifting-tackle blocks equipped with means for indicating the load which is being lifted.

The aim of the invention is to provide a mechanical pulley-block balance of novel and simple design.

The pulley-block balance in accordance with the invention comprises in known manner at least one loose pulley of hollow construction over which the lifting cable runs, a coaxial support of hollow construction on which the pulley is supported by ball-bearing means, a hook or the like for receiving the load, and coupling means between said hook and said support. The balance is distinguished by the fact that said coupling means comprise a movable member which is capable of undergoing displacement at least at the point of application of the force arising from the load, said movable member being subjected to a restoring action in the direction opposite to said force and adapted to control load-indicating means as a result of its displacement under the action of said force.

In one embodiment of the invention, said movable member is resilient and carried directly by said support.

In another embodiment, said movable member is rigid and subjected to the restoring action of elastic means.

A more complete understanding of the invention will be gained from the following description, reference being made to the accompanying drawings, wherein.

Figure 1:
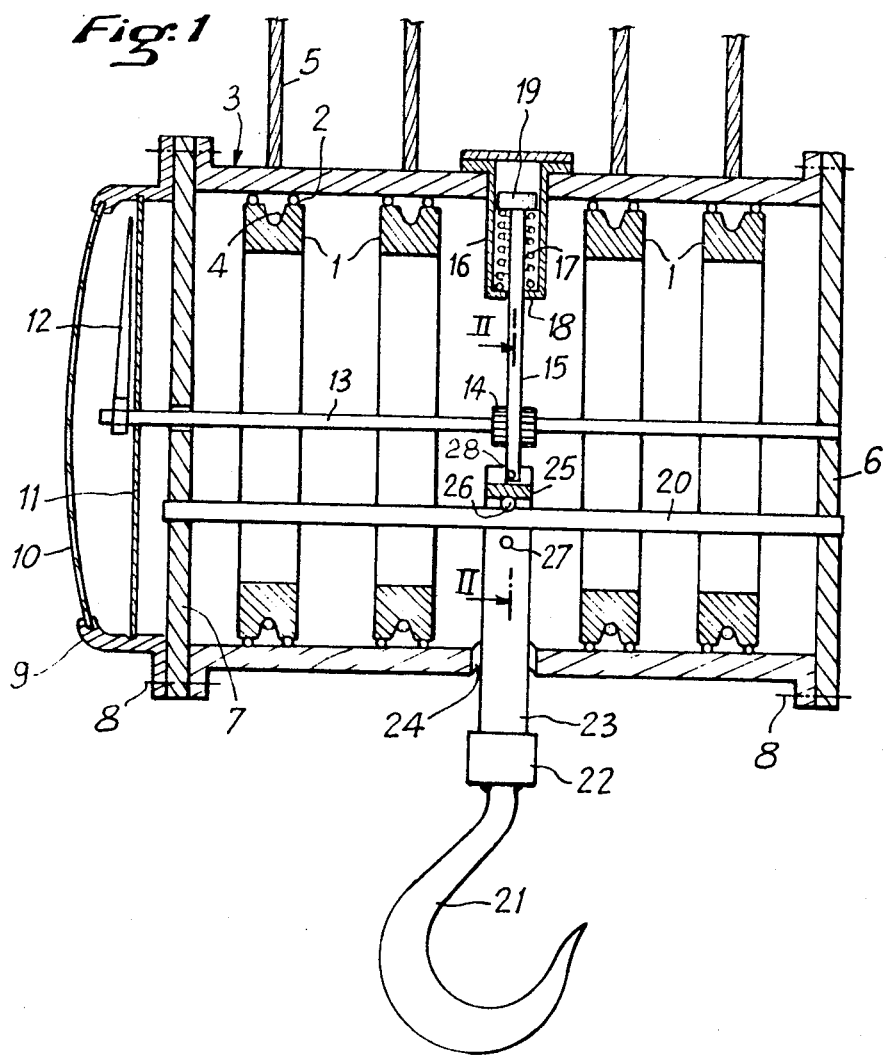
FIG. 1 is a diagrammatic axial sectional view of a pulley-block balance in accordance with the invention.
Figure 2:
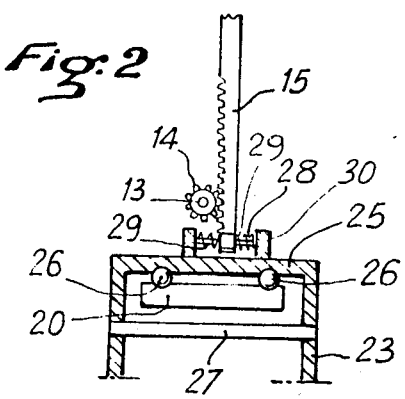
FIG. 2 is a sectional view taken along line II—II and showing part of the pulley-block of FIG. 1.

The pulley-block balance shown in FIGS. 1 and 2 comprises in known manner hollow coaxial pulleys 1 mounted by means of ball-bearings 2 within a support 3 in the form of a sleeve which is coaxial with the pulleys 1. This mode of assembly is described in French patent Application No 77 26844 filed by the present Applicant on Sept. 5th, 1977 in respect of "Coaxial assembly comprising a rotating element and its support". The pulleys 1 each have a circular external groove 4 for receiving the lifting cable 5. The sleeve 3 is provided in a suitable manner with windows (not shown) through which the cable is intended to pass.

The support 3 is closed at both ends by solid radial cheeks 6, 7 secured at 8 by means of flange-bolts, for example.

There is mounted on the outer face of the cheek an optical load indicator provided with a casing 9, a glass face 10, a graduated dial 11 and a pointer 12 which is capable of moving in front of the dial 11 and is rigidly fixed to a rod 13 extending coaxially over the entire length of the pulley-block. A spur-tooth pinion 14 is keyed on the rod 13 at the center of the pulley-block between two pulleys 1. Said pinion is disposed in meshing engagement with a vertical rack-bar 15. At the upper end thereof, said rack-bar 15 penetrates into a fixed casing 16 which is mounted within the sleeve 3. Said fixed casing is adapted to accommodate a compression spring 17 which produces action on the lower end-wall 18 of this latter and a head 19 of the rack-bar 15 for displacing this latter in the upward direction.

It is apparent that the vertical displacement of the rack-bar causes the rotational displacement of the pointer 12 in front of the dial 11.

Said vertical displacement is controlled by the deformation of a resilient strip 20 which extends parallel to the axis of the pulley-block and beneath said axis within the interior of the pulleys 1. The resilient strip 20 is designed in any suitable manner according to the loads to be lifted and the ends of said strip are secured to the cheeks 6, 7. The arrangement adopted for mounting said strip on said cheeks is such as to permit flexural deformation by means of a slight displacement in sliding motion. If so required, a stop system (not shown in the drawings) serves to limit the flexural deformation of the resilient strip if the applied force exceeds the capacity of the pulley-block.

The hook 21 of the pulley-block is mounted by means of a hanger bearing 22 at the lower end of a vertical suspension arm 23 or the like which traverses the sleeve 3 through an opening 24 substantially in the line of extension of the rack-bar 15. The arm 23 is provided at least at the upper end with two parallel branches and these latter are joined together at the extremity by means of a web 25 which is supported on the resilient strip 20 by means of two balls 26. This arrangement permits of good centering of the arm on the resilient strip at the time of lifting. A locking-pin 27 serves to connect the two branches of the arm 23 beneath the resilient strip 20 in order to limit angular displacement.

The rack bar 15 is coupled to the arm 23 by means of a locking-pin 28 which is rigidly fixed to two lugs 30 of the web 25. Two opposing springs 29 produce action on each side of the rack-bar 15 and are applied against the lugs 30 in order to urge the rack-bar towards the central position. The locking-pin 28 passes through the rack-bar 15 with a sufficient clearance to permit of angular displacement of the arm 23.

It is understood that, under the action of the load applied to the hook 21, the resilient strip 20 sags over a distance corresponding to the weight of the load. This sag or downward flexural deformation permits downward motion of the assembly consisting of arm 23 and hook 21 and consequently the downward motion of the rack-bar 15 which controls the pointer 12.

Figure 3:
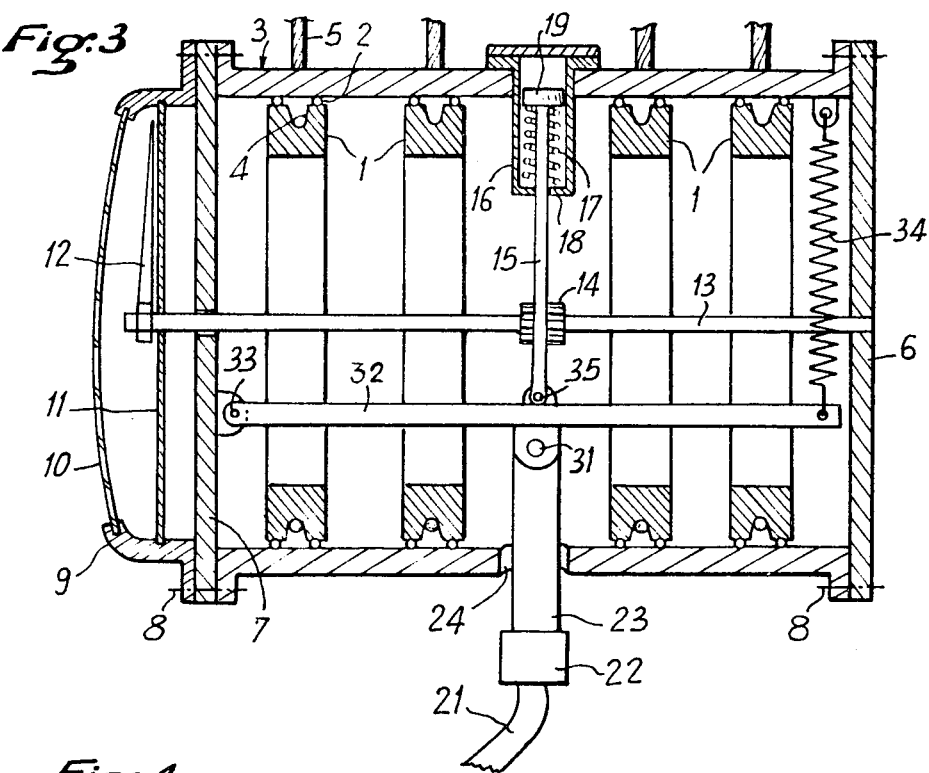
FIGS. 3 to 8 are axial sectional views of six alternative embodiments.

There is shown in FIG. 3 an alternative embodiment in which the arm 23 is pivotally connected at 31 to a rigid rod 32 which replaces the resilient strip 20 of FIGS. 1 and 2. One end of the rod 32 is pivotally mounted at 33 on the cheek 7 whilst the other end located next to the cheek 6 receives the extremity of a tension spring 34, the other extremity of which is attached to the sleeve 3. As will be readily apparent, the spring 34 will be mounted in such a manner as to ensure that it does not interfere with the pointer rod 13. The rack-bar is directly connected to the rod 32 by means of an articulated coupling shown at 35. So far as all the remaining arrangements are concerned, the embodiment of FIG. 3 is similar to that of FIGS. 1 and 2 and reference will accordingly be made to the relevant description given earlier.

Figure 4:
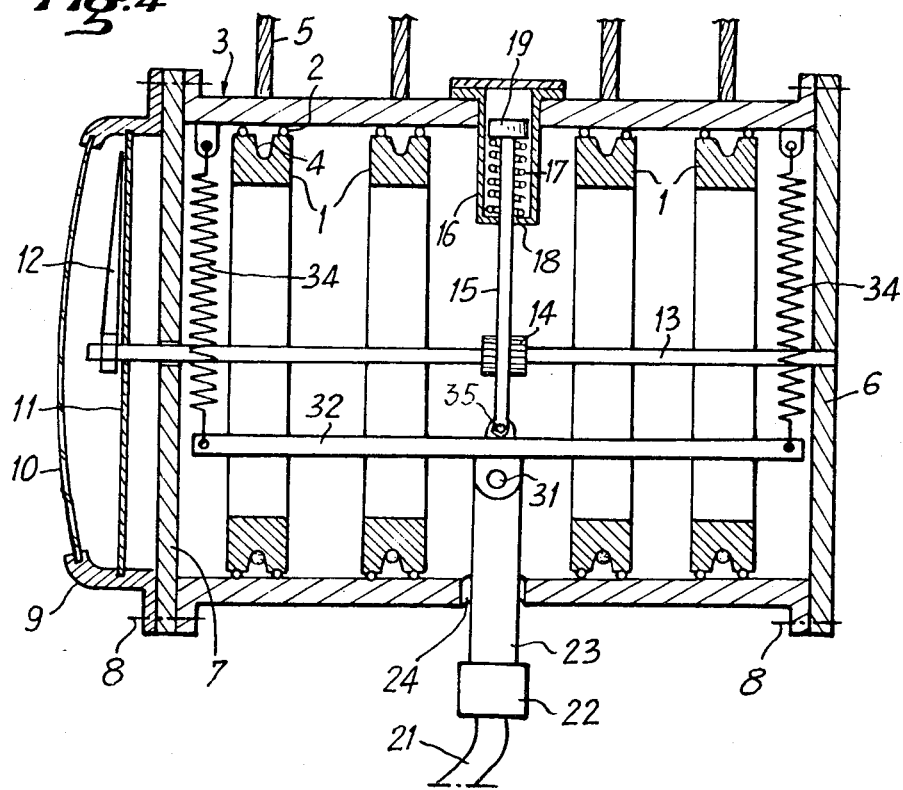

In the embodiment of FIG. 4, the rod 32 forms a compensation bar and a spring 34 is attached to each end of the bar. The other extremity of the spring is attached to the sleeve 3 as described in FIG. 3. In all other respects, this embodiment remains similar to the embodiment of FIG. 3 which has also been described in the foregoing and to which reference can be made.

Figure 5:
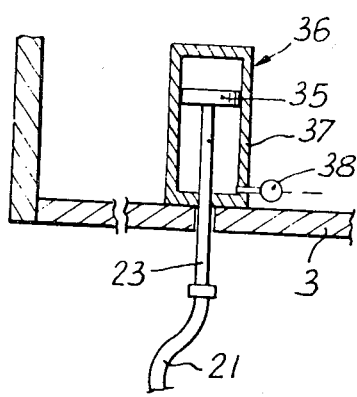

In the embodiment of FIG. 5, which is a vertical sectional view of part of a pulley-block in accordance with the invention, the arm 23 is rigidly fixed to the piston 35 of a pneumatic or hydraulic cylinder 36, the body 37 of which is rigidly fixed to the sleeve 3. A pressure gage 38 serves to measure the pressure developed within the cylinder under the action of the load and the information collected is representative of the load carried by the hook 21.

Figure 6:
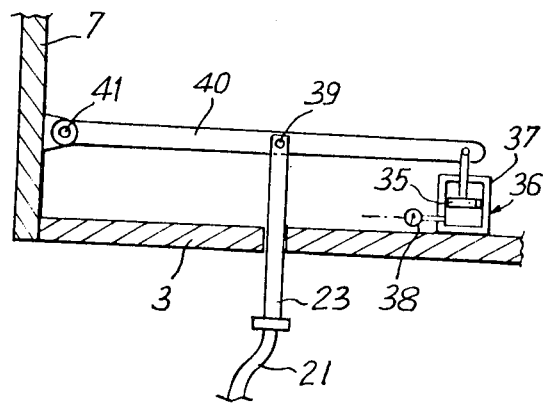

In the embodiment shown in FIG. 6, the arm 23 which carries the hook 21 produces action indirectly on the piston 35. To this end, said arm is pivotally connected at 39 to a longitudinal lever 40, one end of which is pivotally mounted on the cheek 7 at 41. The other end of said lever beyond the articulation 39 is pivotally connected to the end of the piston 35 of the cylinder 36, the body 37 of which is rigidly fixed to the sleeve 3.

Figure 7:
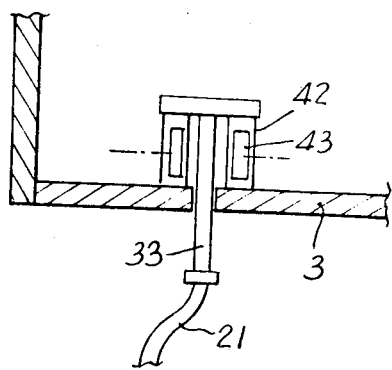

In the embodiment of FIG. 7, the arm 23 which carries the hook 21 is attached to the sleeve 3 by means of a compression member 42 which carries strain gages 43 or the like. The electrical information collected is representative of the deformation of the member 42 and therefore of the load applied to the hook 21.

Figure 8:
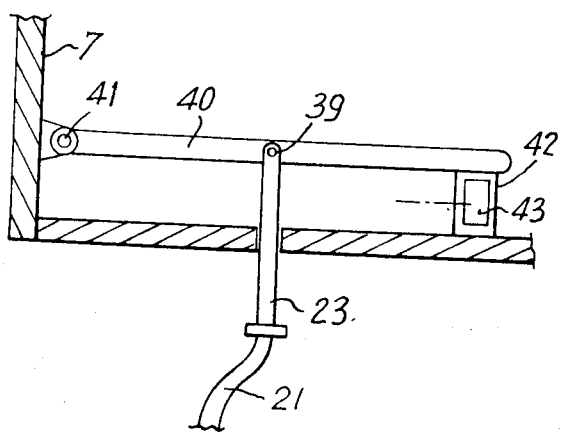

In the embodiment shown in FIG. 8, the arm 23 produces action indirectly on the compression member 42 which carries the gages 43. To this end, the arm 23 is pivotally connected at 39 to a longitudinal lever 40, one end of which is pivotally mounted on the cheek 7 at 41 whilst the other end of said lever which is located beyond the articulation 39 is applied against the member 42.

It will readily be apparent that arrangements other than those described in the foregoing can be contemplated both in the case of elastic means for producing action on the movable member and in the case of a resilient movable member; it accordingly follows that, instead of working in flexion, the movable member could work in torsion. Moreover, the support 3 for the pulleys could be located within the interior of these latter.

I claim:

1. A pulley-block balance comprising at least one loose pulley over which the lifting cable runs, a coaxial support of hollow construction on which the pulley is supported by ball-bearing means, a hook or the like for receiving a load, and coupling means between said hook and said support, wherein said coupling means comprise a movable member which is capable of undergoing displacement at least at the point of application of the force arising from the load, said movable member being located within the internal space which is common to the support and to the pulley and being subjected to a restoring action in the direction opposite to said force and adapted to control load-indicating means as a result of its displacement under the action of said force.

2. A pulley-block balance according to claim 1, wherein the load-indicating means comprise on one face of the pulley-block, a dial and a pointer which is rigidly fixed to a longitudinal rod.

3. A pulley-block balance according to claim 2, wherein the movable member controls the pointer rod by means of a rack-bar disposed in meshing engagement with a pinion keyed on said rod.

4. A pulley-block balance according to claim 1, wherein said movable member extends in the longitudinal direction within the interior of the pulley and of the pulley support.

5. A pulley-block balance according to claim 1, wherein said movable member is resilient.

6. A pulley-block balance according to claim 5, wherein said balance comprises a resilient strip held at both ends by radial cheeks which are rigidly fixed to the pulley support aforesaid.

7. A pulley-block balance according to claim 6, wherein the flexible strip is mounted on the cheeks in such a manner as to permit a slight movement of said strip at the points of attachment.

8. A pulley-block balance according to claim 1, wherein the movable member aforesaid is rigid and subjected to the action of elastic means at least at one end of said member.

9. A pulley-block balance according to claim 8, wherein said member is pivotally mounted at one end on a cheek which is rigidly fixed to the pulley support aforesaid.

10. A pulley-block balance according to claim 1, wherein the lifting hook is carried by a suspension element which extends through said support and produces action on said movable member through coupling means which permit of relative motion between said movable member and said suspension element.

11. A pulley-block balance according to claim 1, wherein the movable member forms part of a fluid cylinder and comprises means for measuring the pressure within said cylinder.

12. A pulley-block balance according to claim 1, wherein the movable member is deformable under the action of the load applied to the hook and comprises means for measuring the deformation of said member.

* * * * *